(12) United States Patent
Hsu et al.

(10) Patent No.: US 12,532,083 B2
(45) Date of Patent: Jan. 20, 2026

(54) AUTOMATIC WHITE BALANCING (AWB) IN VARIABLE APERTURE (VA) CAMERA SYSTEMS

(71) Applicant: QUALCOMM Incorporated, San Diego, CA (US)

(72) Inventors: Yi-Chun Hsu, Taipei (TW); Tai-Hsiang Jen, Taipei (TW); Zhi Qin, Shenzhen (CN); Tsung-yen Chen, Taichung (TW); Wei-Chih Liu, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 18/729,055

(22) PCT Filed: Mar. 25, 2022

(86) PCT No.: PCT/CN2022/083032
§ 371 (c)(1),
(2) Date: Jul. 15, 2024

(87) PCT Pub. No.: WO2023/178653
PCT Pub. Date: Sep. 28, 2023

(65) Prior Publication Data
US 2025/0119654 A1    Apr. 10, 2025

(51) Int. Cl.
*H04N 23/88*    (2023.01)
(52) U.S. Cl.
CPC .................. *H04N 23/88* (2023.01)
(58) Field of Classification Search
CPC ...... H04N 1/6077; H04N 23/13; H04N 23/45; H04N 23/88; H04N 23/90
(Continued)

(56) References Cited

U.S. PATENT DOCUMENTS

| 2012/0281110 A1 | 11/2012 | Ogawa |
| 2019/0014270 A1* | 1/2019 | Yuan ................ H04N 23/57 |

(Continued)

FOREIGN PATENT DOCUMENTS

| CN | 108259877 A | 7/2018 |
| CN | 111314683 A | 6/2020 |

(Continued)

OTHER PUBLICATIONS

International Search Report and Written Opinion—PCT/CN2022/083032—ISA/EPO—Jan. 3, 2023.

*Primary Examiner* — Anthony J Daniels
(74) *Attorney, Agent, or Firm* — Norton Rose Fulbright US LLP/QUALCOMM Incorporated

(57) ABSTRACT

This disclosure provides systems, methods, and devices for image processing that support enhanced white balancing operations. In a first aspect, a method of image processing includes receiving first image data obtained at a first aperture; determining a first output image frame based on the first image data by applying a first white balancing to at least a portion of the first image data; receiving second image data obtained at a second aperture; and determining a second output image frame based on the second image data by applying a second white balancing based on the first aperture and the second aperture to at least a portion of the second image data. The second white balancing may be based on a first compensation factor based on the first aperture and the second aperture used to adjust the first white balancing. Other aspects and features are also claimed and described.

30 Claims, 4 Drawing Sheets

(58) Field of Classification Search
USPC .................................................... 348/223.1
See application file for complete search history.

(56) References Cited

U.S. PATENT DOCUMENTS

2020/0014899 A1\* 1/2020 Miyamoto ............. H04N 23/88
2022/0382024 A1\* 12/2022 Shabtay ................ H04N 23/45

FOREIGN PATENT DOCUMENTS

| CN | 112532960 A | | 3/2021 | |
|----|-------------|---|--------|---|
| JP | H09131310 A | \* | 5/1997 | |
| WO | WO-2022036539 A1 | \* | 2/2022 | ........... H04N 1/6086 |

\* cited by examiner

AUTOMATIC WHITE BALANCING (AWB) IN VARIABLE APERTURE (VA) CAMERA SYSTEMS

TECHNICAL FIELD

Aspects of the present disclosure relate generally to image processing, and more particularly, to automatic white balancing. Some features may enable and provide improved image processing, including reducing the display of unexpected colors when capturing images.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Human eyes perceive colors in a different manner than electronic image sensors. One configuration records separate red, green, and blue color values representing a scene. The appearance of a scene, and particularly the color of objects in the scene, is dependent on the illumination source. Different illumination sources have different light colors, which can be observed by comparing an incandescent bulb that outputs yellow-tinted white light to a light-emitting diode (LED) that outputs blue-tinted white light. Human eyes adapt to different light sources, whereas electronic image sensors generally capture light information identically in different scenes. As a result, the recorded colors from an electronic image sensor may not match the human-perceived color of the scene, such as when human eyes compensate for the yellow tinting to make white objects appear white even when lit by incandescent bulbs while the electronic image sensor records white objects as yellow when lit by incandescent bulbs. A white balancing algorithm may be applied to the output of the electronic image sensor to compensate for different lighting sources to improve the match between the electronic representation of the scene and the human-perceived appearance of the scene.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In variable aperture (VA) cameras, the channel sensitivity of a camera module (including lens and sensor) may be different across different aperture settings. A dynamic WB compensation for a VA system may be based on the aperture size and a relationship between the first and second apertures. The dynamic WB compensation may include generation of WB calibration factors for different apertures in different lighting conditions. Then, based on the lighting conditions and aperture, compensation factors may be determined through interpolation. The compensation factor for a given aperture and lighting scene condition may be used to determine a WB shift between apertures. The WB shift may be used to compensate the channel sensitivities when the aperture changes.

In one aspect of the disclosure, a method for image processing includes receiving first image data obtained at a first aperture; determining a first output image frame based on the first image data by applying a first white balancing to at least a portion of the first image data; receiving second image data obtained at a second aperture; and determining a second output image frame based on the second image data by applying a second white balancing based on the first aperture and the second aperture to at least a portion of the second image data. In some embodiments, the second white balancing operation is determined by determining a first compensation factor based on the first aperture and the second aperture; and adjusting the first white balancing by the first compensation factor to determine the second white balancing, wherein determining the second output image frame is based on the second white balancing.

In an additional aspect of the disclosure, an apparatus includes at least one processor and a memory coupled to the at least one processor. The at least one processor is configured to perform operations including receiving first image data obtained at a first aperture;

determining a first output image frame based on the first image data by applying a first white balancing to at least a portion of the first image data; receiving second image data obtained at a second aperture; and determining a second output image frame based on the second image data by applying a second white balancing based on the first aperture and the second aperture to at least a portion of the second image data.

In an additional aspect of the disclosure, an apparatus includes means for receiving first image data obtained at a first aperture; means for determining a first output image frame based on the first image data by applying a first white balancing to at least a portion of the first image data; means for receiving second image data obtained at a second aperture; and means for determining a second output image frame based on the second image data by applying a second white balancing based on the first aperture and the second aperture to at least a portion of the second image data.

In an additional aspect of the disclosure, a non-transitory computer-readable medium stores instructions that, when executed by a processor, cause the processor to perform operations. The operations include receiving first image data obtained at a first aperture; determining a first output image frame based on the first image data by applying a first white balancing to at least a portion of the first image data; receiving second image data obtained at a second aperture; and determining a second output image frame based on the second image data by applying a second white balancing based on the first aperture and the second aperture to at least a portion of the second image data.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
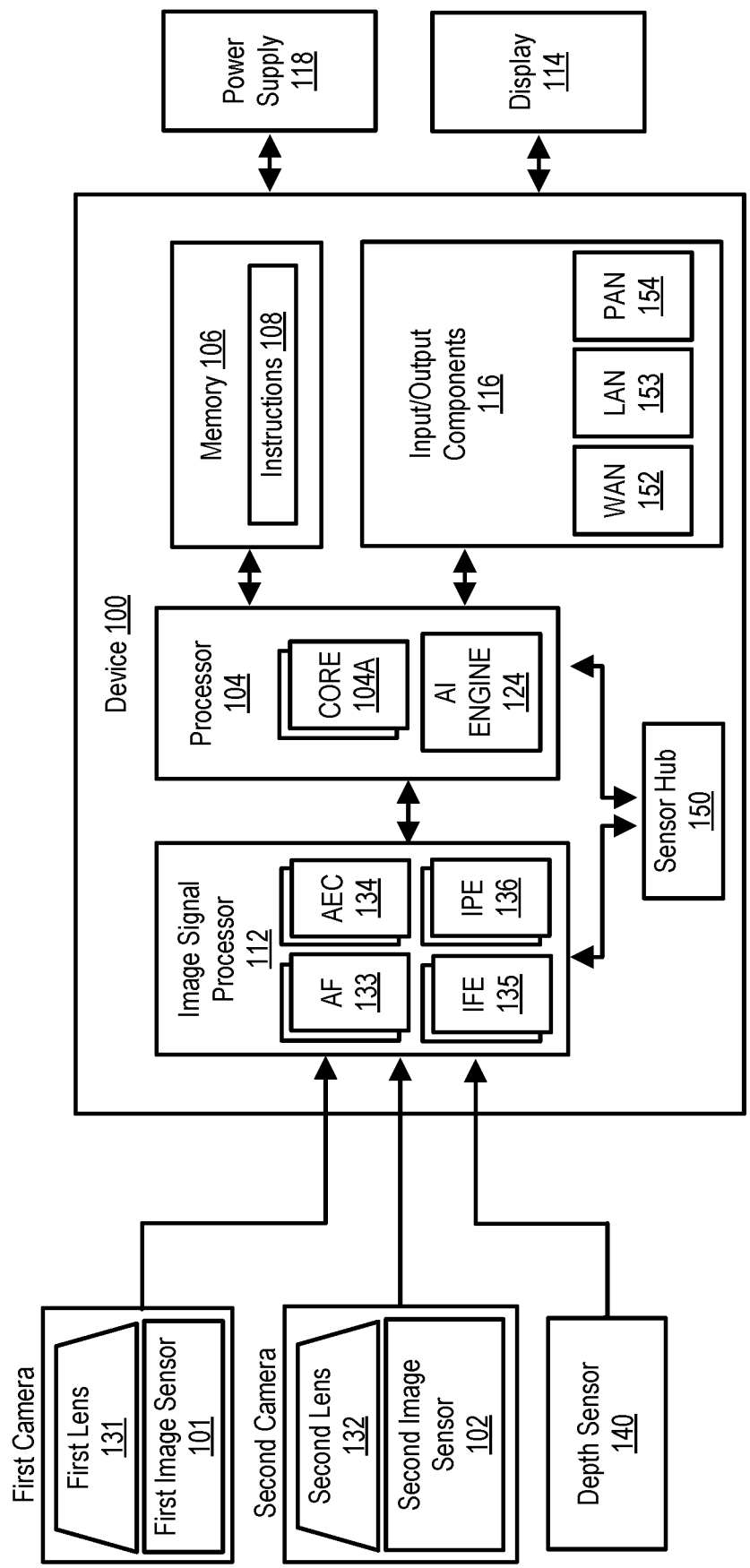
FIG. 1 shows a block diagram of an example device for performing image capture from one or more image sensors according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Automatic white balancing (AWB) in an image capture device analyzes received image data from an image sensor and generates corrected image data by adjusting the received image data to adjust a white balance in the image data, such as to compensate for a light source. For example, the received image data may be adjusted such that a white shirt that appears yellow due to, for example, sunlight or an incandescent bulb, correctly appears as white by changing the sensitivity of the color channels (e.g., red, green, and blue channels) to reduce the yellow appearance. Other colors in the scene may be adjusted in a similar manner based on adjustments used to correct white appearances to be white. During an image capture operation, the aperture of the camera may change based on device control, user request, changing conditions, and/or other events. The aperture changes may lead to white balance inconsistency because the sensitivity of the camera may change based on different interactions of the light with the various elements of the camera, e.g., lens, aperture, image sensor.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

The present disclosure provides systems, apparatus, methods, and computer-readable media that support improved automatic white balancing by compensating for change in a representation of the scene as a result of changing aperture of the camera acquiring image data comprising the representation of the scene. The white balancing may compensate image data based on a previous, first aperture and a current, second aperture by applying a compensation factor to channel sensitivities (e.g., WB gain values) applied to image data obtained immediately after the aperture change to the second aperture.

Particular implementations of the subject matter described in this disclosure may be implemented to realize one or more of the following potential advantages or benefits. In some aspects, the present disclosure provides techniques for improving image appearance by reducing unusual or unexpected color casts in image data received from an image sensor and viewed by a user. Compensating for the changing aperture may provide more realistic appearing images by using a AWB calibration system for variable aperture (VA) image capture systems. Additionally, generation of a preview during a change in aperture of a VA image capture system using aspects of this disclosure may display smoother white balancing transition in real-time aperture switching.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and/or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112. The ISP 112 may additionally execute an automatic white balancing (AWB) engine for performing white balancing operations. The AWB engine may execute in, for example, the image front ends (IFEs) 135 or other dedicated or general processing circuitry within the ISP 112 or the image capture device 100, such as on a digital signal processor (DSP).

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

In some embodiments of an image capture device, the first camera and/or second camera may support variable aperture (VA) operation, allowing the aperture to vary during the capture of image data. Color appearances in the image data may change with the changing aperture due to different light reaching the image sensor through the aperture. White balancing in an image capture device may correct for the different image characteristics of image data captured at different apertures through the variable aperture. In some embodiments, the image processing described herein may be performed separate from the capture of the image data, such as when aspects of the image processing described herein are performed after acquiring the image data.

Figure 2:
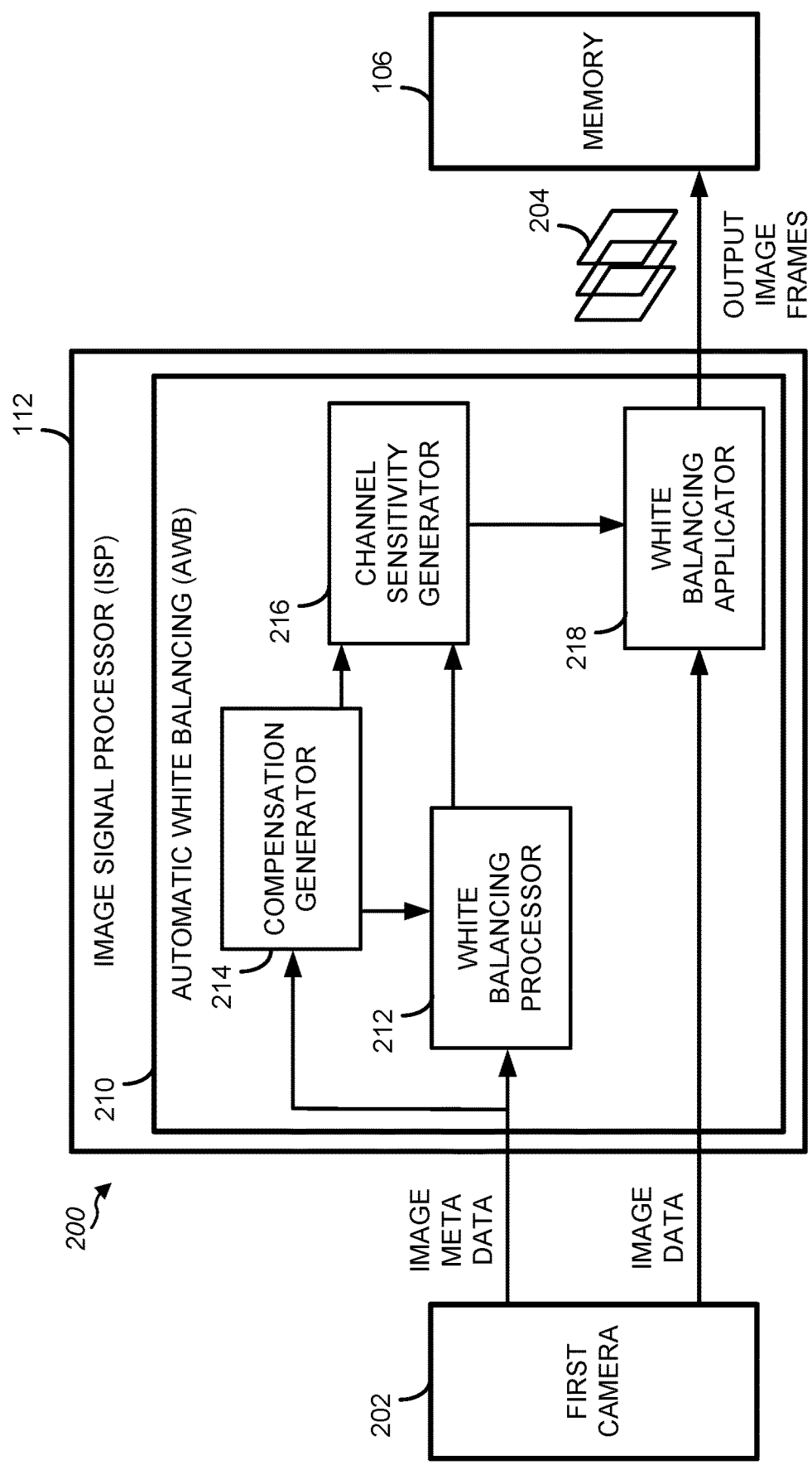
FIG. 2 shows a block diagram of an example white balancing system for image processing of image data from one or more image sensors according to one or more aspects of the disclosure.

FIG. 2 shows a block diagram of an example white balancing system for image processing of image data from one or more image sensors according to one or more aspects of the disclosure. An image signal processor (ISP) 112 may include automatic white balancing (AWB) block 210. The ISP 112 receives image data and image metadata from the first camera 202. The image metadata may include, for example, an aperture size at the first camera 202 used to acquire corresponding image data. The image data may be provided to the white balancing applicator block 218, which applies a white balancing algorithm to adjust the channels (e.g., red channel, blue channel, and green channel) of the image data to improve the appearance of the scene represented by the image data by producing image data that more accurately represents the human eye's perception of the scene. The white balancing algorithm may multiple color channel data within the image data by WB gain values that adjust a ratio of blue to green (b/g) and red to green (r/g). The white balance (WB)-corrected image data may be formed into output image frames 204. The output image frames 204 may be stored in memory 106, which may be further processed by other processing circuitry, stored in other storage devices, output to a display, and/or transmitted through a network.

The white balancing applied in white balancing applicator block 218 may involve the application of channel sensitivity values to the image data. For example, the white balancing applicator block 218 may multiple the red channel image data and the blue channel image data by r/g and b/g sensitivity values. Those sensitivity values may be generated by the channel sensitivity generator block 216. The channel sensitivity generator block 216 may receive one or more compensation factors from compensation generator 214 and channel sensitivities corresponding to a calibrated aperture from white balancing processor block 212. The channel sensitivity generator block 216 may adjust the output of the white balancing processor 212 by scaling channel sensitivities from white balancing processor block 212 using the one or more compensation factors.

The compensation factors are received from compensation generator block 214, which may determine a white balance shift between a previous first aperture and a current second aperture. The white balance shift may also be dependent upon the current lighting condition of the scene. The WB shift is used to compensate the output WB gain applied by the white balancing applicator 218 when the aperture of camera 202 is changed from the first aperture to the second aperture. The compensation factors may be based on calibration data. The compensation generator 214 may also generate additional parameters for controlling the channel sensitivity generator block 216, such as a flexible factor, which may be determined from triggers defined by tuning parameters to fine-tune the compensation.

The white balancing processor block 212 may generate initial channel sensitivities values for the current aperture of camera 202 based on calibration data. For example, the white balancing processor block 212 may have access to calibration data for a number of modules at a number of apertures. The white balancing processor block 212 may use information regarding the module present in the camera 202 and the aperture size to select channel sensitivity values from the calibration data to output to the channel sensitivity generator block 216. In some embodiments, the aperture and/or module of the camera 202 may not match the calibration data and an estimated channel sensitivity for the aperture and/or module is determined based on the calibration data. For example, channel selectivities for the aperture may be interpolated between calibration data corresponding to the most similar in size apertures available in the calibration data.

In some embodiments, the channel sensitivity generator block 216 may determine sensitivities as:

$$AWB_{aperture2} = AWB_{aperture1} * \text{Compensation\_Factor},$$

wherein $AWB_{aperture2}$ is the sensitivity value or values (e.g., a set of two values corresponding to r/g and b/g gains) to be applied by white balancing applicator block 218 to image data captured at a second aperture, $AWB_{aperture1}$ is the sensitivity value or values for the first aperture applied to image data captured at the first aperture prior to the change to the second aperture, and Compensation_Factor is the output of compensation generator block 214. Compensation_Factor may be generated by compensation generator block 214 in some embodiments based on the equation:

$$\text{Compensation\_Factor} = F_B/F_A,$$

wherein $F_A$ is the channel sensitivity for the first aperture and $F_B$ is the channel sensitivity for the second aperture. In some embodiments the $F_A$ and $F_B$ values may be channel sensitivities for the different first and second apertures that are specific to scene conditions, such as specific to a certain scene CCT.

In some embodiments, additional factors may be used to adjust the white balancing when changing from a first aperture to a second aperture, such as a flexible factor. The channel sensitivity generator block 216 may determine sensitivities as:

$$AWB_{aperture2} = AWB_{aperture1} * \text{Compensation\_Factor} * \text{Flexible\_Factor}.$$

The application of white balancing channel sensitivities based on the first aperture to the image data captured at the second aperture may reduce the appearance of abrupt color changes when changing from the first aperture to the second aperture. One method for the processing of image data to reduce color shifts is shown in FIG. 3.

Figure 3:
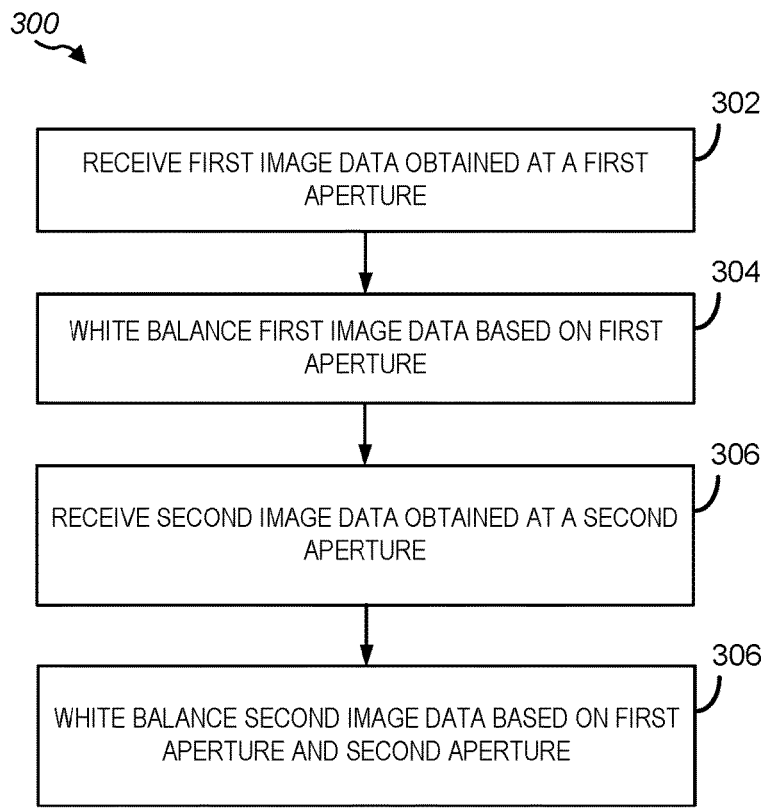
FIG. 3 shows a flow chart of an example method for performing white balancing processing on image data according to one or more aspects of the disclosure.

FIG. 3 shows a flow chart of an example method for performing white balancing processing on image data according to one or more aspects of the disclosure. A method 300 includes, at block 302, receiving first image data obtained at a first aperture. The first image data may be received at ISP 112 from camera 202 over a bus interface. The first image data may alternatively be received at ISP 112 from a memory that stores previously-recorded image data for processing. For example, the ISP 112 may receive the first image data from a buffer between the camera 202 and the ISP 112 or may receive the first image data from a system memory, a non-volatile storage memory, or a network connection.

At block 304, white balancing is applied to the first image data based on the first aperture. The white balancing operation may be performed by the AWB 210 in the ISP 112. The white balancing at block 304 may include no compensation factor from the compensation generator block 214 in a steady-state condition, such as when the aperture has not changed within a certain period of time. The white balancing at block 304 may be based on calibration data for the first aperture or on channel sensitivities that are determined for the first aperture determined based on the calibration data for other apertures.

At block 306, second image data is received, wherein the second image data is obtained at a second aperture. The second image data may represent the same scene, with the same scene conditions such as scene CCT, as the first image data at block 302. The second image data may be received in a same manner or a different manner than the first image data is received at block 302. The second image data may be captured at a second aperture different from the first aperture after the ISP 112 instructs the camera 202 to change aperture to the second aperture. Alternatively, the second image data may be captured at a second aperture different from the first aperture after the ISP instructions the camera 202 to change from camera 202 to a different camera with a different aperture.

At block 308, white balancing is applied to the second image data based on the first aperture and the second aperture. The application of white balancing channel sensitivities based on the first aperture to the image data captured at the second aperture reduces the appearance of abrupt color changes when changing from the first aperture to the second aperture. This may provide a smoother white balance transition in real-time aperture switching between the first aperture and the second aperture when capturing the first image data and second image data. The white balancing of block 308 may include determining and applying a compensation factor based on the first aperture and the second aperture as described with reference to compensation generator block 214 of FIG. 2. In some embodiments, the compensation factors may be generated by interpolation from calibration data according to different apertures. The compensation factors may be applied to compensate the WB gains when the aperture is changed. In some embodiments, the second white balancing may be based on lighting conditions (e.g., CCT, brightness, hue) of the first image data and the second image data.

Figure 4:
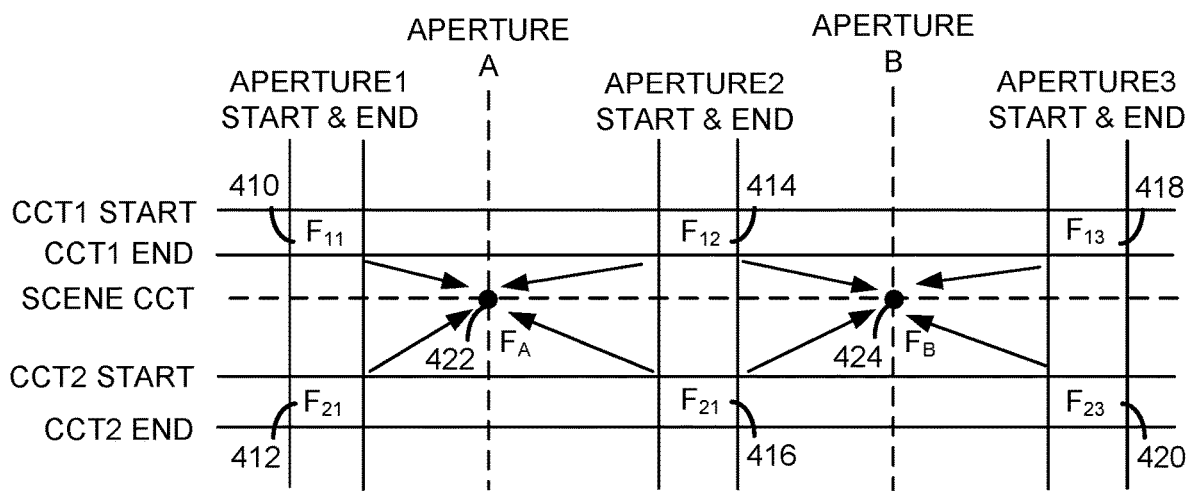
FIG. 4 shows a graph of an example variable aperture configuration for an image sensor according to one or more aspects of the disclosure.

One manner of determining a compensation factor for the white balancing of block 306 is described with reference to FIG. 4. FIG. 4 shows a graph of an example variable aperture configuration for an image sensor according to one or more aspects of the disclosure. The graph of FIG. 4 shows a variety of correlated color temperatures (CCTs) on a y-axis and a variety of apertures on an x-axis. Within the color-aperture space of FIG. 4, calibration data is available for certain aperture ranges and CCTs. For example, FIG. 4 shows example calibration data 410, 412, 414, 416, 418, and 420. Calibration data 410 labeled F11 is calibration data for apertures between Aperture 1 start and end and CCTs between CCT1 start and end. Calibration data 412 labeled F21 is calibration data for apertures between Aperture 1 start and end and CCTs between CCT2 start and end. Calibration data 414 labeled F12 is calibration data for apertures between Aperture 2 start and end and CCTs between CCT2 start and end. Calibration data 416 labeled F22 is calibration data for apertures between Aperture 2 start and end and CCTs between CCT2 start and end. Calibration data 418 labeled F13 is calibration data for apertures between Aperture 3 start and end and CCTs between CCT1 start and end. Calibration data 420 labeled F23 is calibration data for apertures between Aperture 3 start and end and CCTs between CCT2 start and end.

First image data received at block 302 of FIG. 3 may be received from a camera configured with Aperture A and Scene CCT corresponding to point 422 on the graph of FIG. 4. The white balancing of the first image data may be based on point 422. When point 422 is outside channel sensitivity calibration data 410, 412, 414, 416, 418, 420, the calibration data 410, 412, 414, 416, 418, 420 may be used to determine channel sensitivity at point 422, such as by interpolating from two, three, or four nearby sets of calibration data. For example, channel sensitivity for point 422 may be interpolated from calibration data 410, 412, 414, and 416. The interpolated channel sensitivity may be applied to the first image data at block 304. The white balancing of the second image data may be based on point 424 and point 422.

Second image data received at block 306 of FIG. 3 may be received from a camera configured with Aperture B and Scene CCT corresponding to point 424 on the graph of FIG. 4. When point 424 is outside channel sensitivity calibration data 410, 412, 414, 416, 418, 420, the calibration data 410, 412, 414, 416, 418, 420 may be used to determine channel sensitivity at point 424, similar to that described for point 422. For example, point 424 may be interpolated from calibration data 414, 416, 418, and 420. The white balancing of block 306 may be based on the points 422 and 424. For example, the white balancing of block 306 may include applying the channel sensitivity corresponding to point 422 multiplied by a ratio of the point 424 to the point 422, e.g., $F_B/F_A$. The compensated channel sensitivity is then applied to the second image data. After one or other certain number of frames of image data are captured and processed, the white balancing on additional image data may be based on the point 424 to allow a gradual shift to point 424.

Figure 5:
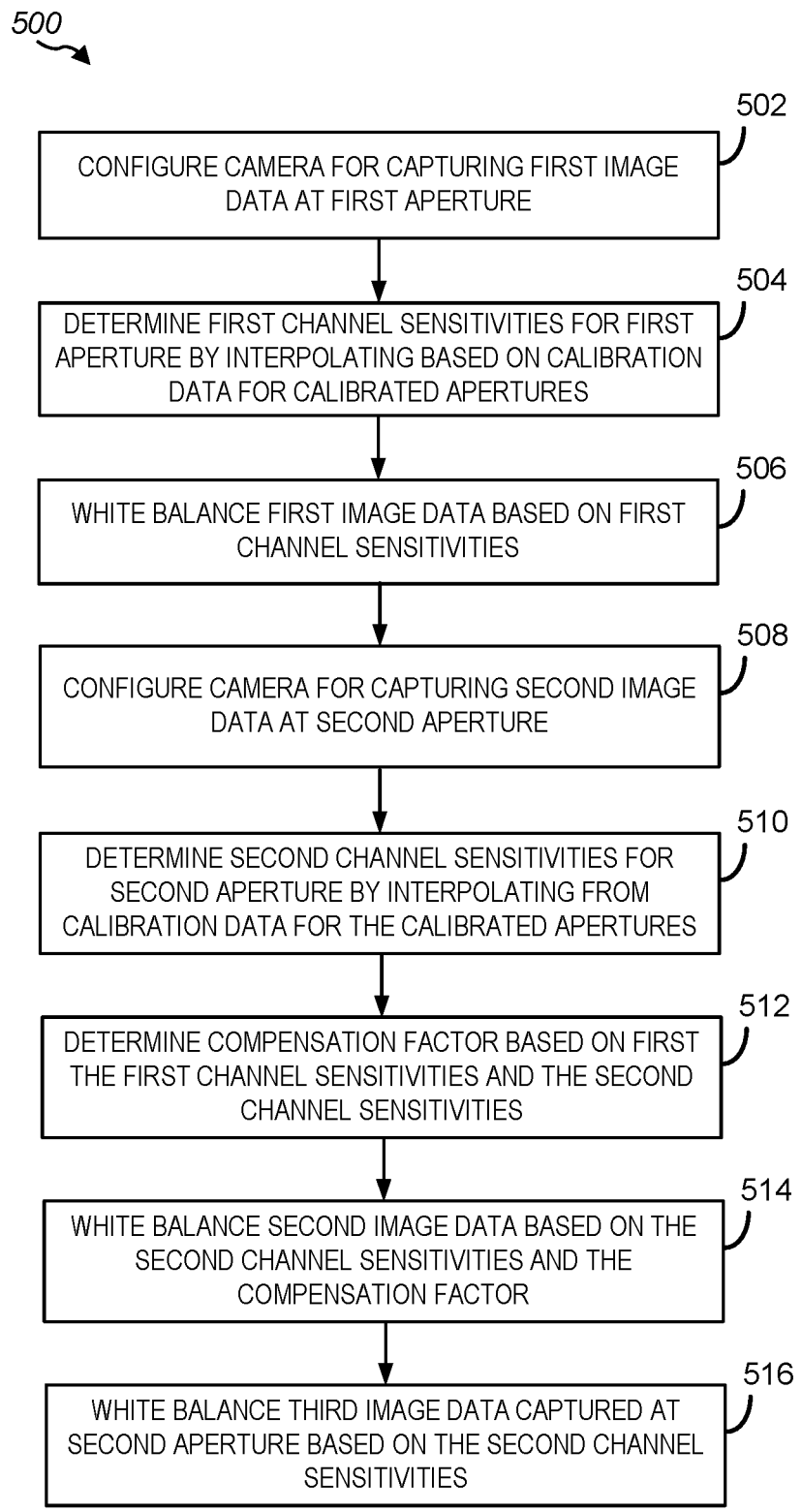
FIG. 5 shows a flow chart of an example method for performing white balancing processing using interpolation from calibration values according to one or more aspects of the disclosure.

A method of image processing using interpolation, such as described with reference to FIG. 4 is shown in FIG. 5. FIG. 5 shows a flow chart of an example method for performing white balancing processing using interpolation from calibration values according to one or more aspects of the disclosure. A method 500 includes, at block 502, configuring a camera for capturing first image data at a first aperture. At block 504, first channel sensitivities for the first aperture are determined by interpolating based on calibration data for calibrated apertures, wherein the calibrate apertures may include apertures different from the first aperture. At block 506, the first image data is white balanced based on the first channel sensitivities.

At block 508, the camera is configured for capturing second image data at a second aperture. This may be based on an automatic camera control system that determines, for example, that more light would improve the appearance of the representation of the scene in the image data. This may alternatively be based on a user selection of a new aperture size in a camera application executing on an image capture device. This may alternatively be based on a user selection of a photography mode change in a camera application, such as when a user selects a portrait photography mode that uses a larger aperture. Then, at block 510, second channel sensitivities are determined for the second aperture by interpolating from calibration data for calibrated apertures. At block 512, one or more compensation factors are determined based on the second channel sensitivities and the first channel sensitivities. At block 514, second image data is white balanced based on the second channel sensitivities and the compensation factor. At block 516, additional image data captured at the second aperture is white balanced based on the second channel sensitivities after a suitable convergence period, such as one, two, or three frames, that reduces the appearance of any abrupt color changes. determining image statistics based on the third image data. Further, a subsequent third output image frame may be determined based on third image data captured at the second aperture by applying a third white balancing based on image statistics of the third image data.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform operations including receiving first image data obtained at a first aperture; determining a first output image frame based on the first image data by applying a first white balancing to at least a portion of the first image data; receiving second image data obtained at a second aperture; and determining a second output image frame based on the second image data by applying a second white balancing. In some aspects, determining the second white balancing may include determining a first compensation factor based on the first aperture and the second aperture; and adjusting the first white balancing by the first compensation factor to determine the second white balancing, wherein determining the second output image frame is based on the second white balancing. Additionally, the apparatus may perform or operate according to one or more aspects as described below. In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first compensation factor is further based on a first lighting condition of the first image data and a second lighting condition of the second image data.

In a third aspect, in combination with one or more of the first aspect or the second aspect, applying the first white balancing comprises applying the first white balancing based on first calibration data.

In a fourth aspect, in combination with one or more of the first aspect through the third aspect, the first calibration data corresponds to a third aperture different from the first aperture, and wherein applying the first white balancing includes operations of determining white balancing channel sensitivities based on the first calibration data by interpolating between the first calibration data corresponding to the third aperture and second calibration data corresponding to a fourth aperture different from the first aperture.

In a fifth aspect, in combination with one or more of the first aspect through the fourth aspect, the first calibration data corresponds to a first aperture range including the third aperture and a first correlated color temperature (CCT) range.

In a sixth aspect, in combination with one or more of the first aspect through the fifth aspect, the second calibration data corresponds to a second aperture range including the fourth aperture and a second correlated color temperature (CCT) range.

In a seventh aspect, in combination with one or more of the first aspect through the sixth aspect, the determining the white balancing channel sensitivities for the first white balancing comprises interpolating between the first calibration data and the second calibration data for the first aperture and a scene CCT of the first image data.

In an eighth aspect, in combination with one or more of the first aspect through the seventh aspect, adjusting the first white balancing by the first compensation factor comprises adjusting the first white balancing by the first compensation factor and a second compensation factor.

In a ninth aspect, in combination with one or more of the first aspect through the eighth aspect, the second white balancing is based on the first aperture and the second aperture such that a first white balance of the first output image frame correlates to a second white balance of the second output image frame.

In a tenth aspect, in combination with one or more of the first aspect through the ninth aspect, the operations further include instructing a camera module to change from the first aperture to the second aperture before receiving the second image data obtained at the second aperture.

In an eleventh aspect, in combination with one or more of the first aspect through the tenth aspect, the operations further include receiving third image data obtained at the second aperture; determining image statistics based on the third image data; and determining a third output image frame based on the third image data by applying a third white balancing based on the image statistics.

In a twelfth aspect, in combination with one or more of the first aspect through the eleventh aspect, determining the second output image frame includes operations of receiving the second image data at a white balancing module of an image signal processor (ISP); and applying the second white balancing in the white balancing module.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both.

The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination;

A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for automatic white balance compensation, comprising:
   receiving first image data obtained at a first aperture;
   determining a first output image frame based on the first image data by applying a first white balancing to at least a portion of the first image data;
   receiving second image data obtained at a second aperture; and
   determining a second output image frame based on the second image data by applying a second white balancing by:
      determining a first compensation factor based on the first aperture and the second aperture; and
      adjusting the first white balancing by the first compensation factor to determine the second white balancing, wherein determining the second output image frame is based on the second white balancing.

2. The method of claim 1, wherein the first compensation factor is further based on a first lighting condition of the first image data and a second lighting condition of the second image data.

3. The method of claim 1, wherein applying the first white balancing comprises applying the first white balancing based on first calibration data.

4. The method of claim 3, wherein the first calibration data corresponds to a third aperture different from the first aperture, and wherein applying the first white balancing comprises:
   determining white balancing channel sensitivities based on the first calibration data by interpolating between the first calibration data corresponding to the third aperture and second calibration data corresponding to a fourth aperture different from the first aperture.

5. The method of claim 4, wherein:
   the first calibration data corresponds to a first aperture range including the third aperture and a first correlated color temperature (CCT) range;
   the second calibration data corresponds to a second aperture range including the fourth aperture and a second correlated color temperature (CCT) range; and
   the determining the white balancing channel sensitivities for the first white balancing comprises interpolating between the first calibration data and the second calibration data for the first aperture and a scene CCT of the first image data.

6. The method of claim 1, wherein adjusting the first white balancing by the first compensation factor comprises adjusting the first white balancing by the first compensation factor and a second compensation factor.

7. The method of claim 1, wherein the second white balancing is based on the first aperture and the second aperture such that a first white balance of the first output image frame correlates to a second white balance of the second output image frame.

8. The method of claim 1, further comprising instructing a camera module to change from the first aperture to the second aperture before receiving the second image data obtained at the second aperture.

9. The method of claim 1, further comprising:
   receiving third image data obtained at the second aperture;
   determining image statistics based on the third image data; and
   determining a third output image frame based on the third image data by applying a third white balancing based on the image statistics.

10. The method of claim 1, wherein determining the second output image frame comprises:
    receiving the second image data at a white balancing module of an image signal processor (ISP); and
    applying the second white balancing in the white balancing module.

11. An apparatus for automatic white balance compensation, comprising:
    a memory storing processor-readable code; and
    at least one processor coupled to the memory, the at least one processor configured to execute the processor-readable code to cause the at least one processor to perform operations including:
       receiving first image data obtained at a first aperture;
       determining a first output image frame based on the first image data by applying a first white balancing to at least a portion of the first image data;
       receiving second image data obtained at a second aperture; and
       determining a second output image frame based on the second image data by applying a second white balancing by:
          determining a first compensation factor based on the first aperture and the second aperture; and
          adjusting the first white balancing by the first compensation factor to determine the second white balancing, wherein determining the second output image frame is based on the second white balancing.

12. The apparatus of claim 11, wherein the first compensation factor is further based on a first lighting condition of the first image data and a second lighting condition of the second image data.

13. The apparatus of claim 11, wherein applying the first white balancing comprises applying the first white balancing based on first calibration data.

14. The apparatus of claim 13, wherein the first calibration data corresponds to a third aperture different from the first aperture, and wherein applying the first white balancing comprises:

determining white balancing channel sensitivities based on the first calibration data by interpolating between the first calibration data corresponding to the third aperture and second calibration data corresponding to a fourth aperture different from the first aperture.

15. The apparatus of claim 14, wherein:
the first calibration data corresponds to a first aperture range including the third aperture and a first correlated color temperature (CCT) range;
the second calibration data corresponds to a second aperture range including the fourth aperture and a second correlated color temperature (CCT) range; and
the determining the white balancing channel sensitivities for the first white balancing comprises interpolating between the first calibration data and the second calibration data for the first aperture and a scene CCT of the first image data.

16. The apparatus of claim 11, wherein adjusting the first white balancing by the first compensation factor comprises adjusting the first white balancing by the first compensation factor and a second compensation factor.

17. The apparatus of claim 11, wherein the second white balancing is based on the first aperture and the second aperture such that a first white balance of the first output image frame correlates to a second white balance of the second output image frame.

18. The apparatus of claim 11, wherein the at least one processor is further configured to execute the processor-readable code to cause the at least one processor to perform operations including:
receiving third image data obtained at the second aperture;
determining image statistics based on the third image data; and
determining a third output image frame based on the third image data by applying a third white balancing based on the image statistics.

19. The apparatus of claim 11, further comprising:
a camera module coupled to the at least one processor, wherein the processor is further configured to execute the processor-readable code to cause the at least one processor to perform operations including instructing the camera module to change from the first aperture to the second aperture before receiving the second image data obtained at the second aperture.

20. The apparatus of claim 19, wherein the at least one processor comprises an image signal processor (ISP).

21. A non-transitory computer-readable medium storing instructions that, when executed by a processor, cause the processor to perform operations comprising:
receiving first image data obtained at a first aperture;
determining a first output image frame based on the first image data by applying a first white balancing to at least a portion of the first image data;
receiving second image data obtained at a second aperture; and
determining a second output image frame based on the second image data by applying a second white balancing by:
determining a first compensation factor based on the first aperture and the second aperture; and
adjusting the first white balancing by the first compensation factor to determine the second white balancing, wherein determining the second output image frame is based on the second white balancing.

22. The non-transitory, computer-readable medium of claim 21, wherein the first compensation factor is further based on a first lighting condition of the first image data and a second lighting condition of the second image data.

23. The non-transitory, computer-readable medium of claim 21, wherein applying the first white balancing comprises applying the first white balancing based on first calibration data.

24. The non-transitory, computer-readable medium of claim 23, wherein the first calibration data corresponds to a third aperture different from the first aperture, and wherein applying the first white balancing comprises:
determining white balancing channel sensitivities based on the first calibration data by interpolating between the first calibration data corresponding to the third aperture and second calibration data corresponding to a fourth aperture different from the first aperture.

25. The non-transitory, computer-readable medium of claim 24, wherein:
the first calibration data corresponds to a first aperture range including the third aperture and a first correlated color temperature (CCT) range;
the second calibration data corresponds to a second aperture range including the fourth aperture and a second correlated color temperature (CCT) range; and
the determining the white balancing channel sensitivities for the first white balancing comprises interpolating between the first calibration data and the second calibration data for the first aperture and a scene CCT of the first image data.

26. The non-transitory, computer-readable medium of claim 21, wherein adjusting the first white balancing by the first compensation factor comprises adjusting the first white balancing by the first compensation factor and a second compensation factor.

27. The non-transitory, computer-readable medium of claim 21, wherein the second white balancing is based on the first aperture and the second aperture such that a first white balance of the first output image frame correlates to a second white balance of the second output image frame.

28. The non-transitory, computer-readable medium of claim 21, wherein the instructions, when executed by a processor, cause the processor to perform further operations comprising:
instructing a camera module to change from the first aperture to the second aperture before receiving the second image data obtained at the second aperture.

29. The non-transitory, computer-readable medium of claim 21, wherein the instructions, when executed by a processor, cause the processor to perform further operations comprising:
receiving third image data obtained at the second aperture;
determining image statistics based on the third image data; and
determining a third output image frame based on the third image data by applying a third white balancing based on the image statistics.

30. The non-transitory, computer-readable medium of claim 21, wherein determining the second output image frame comprises:
receiving the second image data at a white balancing module of an image signal processor (ISP); and
applying the second white balancing in the white balancing module.

* * * * *